United States Patent
Steinhilber (10) Patent No.: US 11,163,032 B2
(45) Date of Patent: Nov. 2, 2021

(54) MEASUREMENT SYSTEM AND METHOD FOR IDENTIFYING A SOURCE DIRECTION OF A WIRELESS ELECTROMAGNETIC EMITTER SIGNAL

(71) Applicant: Rohde & Schwarz GmbH & Co. KG, Munich (DE)

(72) Inventor: Georg Steinhilber, Munich (DE)

(73) Assignee: Rohde & Schwarz GmbH & Co. KG, Munich (DE)

( * ) Notice: Subject to any disclaimer, the term of this patent is extended or adjusted under 35 U.S.C. 154(b) by 452 days.

(21) Appl. No.: 16/212,336

(22) Filed: Dec. 6, 2018

(65) Prior Publication Data

US 2020/0182958 A1 Jun. 11, 2020

(51) Int. Cl.
*G01S 3/58* (2006.01)
*G06F 16/23* (2019.01)
*G01S 3/04* (2006.01)

(52) U.S. Cl.
CPC ............... *G01S 3/58* (2013.01); *G01S 3/043* (2013.01); *G06F 16/2379* (2019.01)

(58) Field of Classification Search
CPC ... G01S 3/043; G01S 3/38; G01S 3/40; G01S 3/58; G06F 16/2379
See application file for complete search history.

(56) References Cited

U.S. PATENT DOCUMENTS

| | | | | |
|---|---|---|---|---|
| 2,406,406 A * | 8/1946 | Sandretto | .................. | G01S 3/58 342/430 |
| 2,700,157 A * | 1/1955 | Hurvitz | .................... | G01S 3/58 342/428 |
| 5,612,929 A * | 3/1997 | Lopes | ................... | G01S 7/6263 367/107 |
| 5,969,676 A * | 10/1999 | Tran | .......................... | G01S 3/46 342/442 |
| 6,018,317 A * | 1/2000 | Dogan | ...................... | G01S 3/74 342/373 |
| 2002/0089449 A1* | 7/2002 | Fox | ........................... | G01S 3/40 342/417 |

(Continued)

*Primary Examiner* — Bernarr E Gregory
*Assistant Examiner* — Fred H Mull
(74) *Attorney, Agent, or Firm* — Christensen O'Connor Johnson Kindness PLLC (57) ABSTRACT

A measurement system for identifying a source direction of a wireless electromagnetic emitter signal is described. The measurement system is a radio frequency measurement system that comprises a rotary antenna and an analyzer or analysis unit being connected to the rotary antenna in a signal transmitting manner. The rotary antenna is a directional antenna and configured to receive the emitter signal and to forward the received emitter signal to the analysis unit for further processing. The measurement system is configured to gather a momentary position of the rotary antenna. The analysis unit is configured to determine a momentary frequency spectrum of the emitter signal and to combine the momentary frequency spectrum with the momentary position to generate source direction data comprising information on both the momentary frequency spectrum of the emitter signal and the momentary position of the rotary antenna. Moreover, a method for identifying a source direction of a wireless electromagnetic emitter signal is described.

17 Claims, 2 Drawing Sheets

(56) References Cited

U.S. PATENT DOCUMENTS

2011/0103452 A1* 5/2011 Park .................. G01S 3/043
375/228
2014/0159954 A1* 6/2014 Stoddard ............ G01S 3/30
342/359

* cited by examiner

MEASUREMENT SYSTEM AND METHOD FOR IDENTIFYING A SOURCE DIRECTION OF A WIRELESS ELECTROMAGNETIC EMITTER SIGNAL

FIELD OF THE DISCLOSURE

Embodiments of the present disclosure relate generally to a measurement system for identifying a source direction of a wireless electromagnetic emitter signal as well as to a method for identifying a source direction of a wireless electromagnetic emitter signal.

BACKGROUND

In order to determine a source direction of a wireless electromagnetic signal, usually several receiving antennas with associated receivers are necessary in order to be able to calculate a receiving direction by means of amplitude and/or phase comparison. This generally relates to a direction finding.

For example, when trying to determine the source direction of a pulsed signal such as a radar signal, a pulse detection has to be performed with two or more antennas and associated pulse analyzers as a first step. In a second step, the amplitudes of the simultaneously received pulse signal via the respective antennas are compared and the reception direction is calculated, also called direction of arrival. In other words, an extra step is needed in order to be able to determine the source direction.

The extra steps, however, are relatively time-consuming and also costly as they require additional measurement devices in order to be performed so that the method lasts longer and the respective measurement system is more expensive due to the additional devices.

Thus, there is a need for a measurement system as well as for a method for identifying a source direction of a wireless electromagnetic signal which allow for a more cost-efficient and less complicated identification of the source direction.

SUMMARY

Embodiments of the present disclosure provide a measurement system for identifying a source direction of a wireless electromagnetic emitter signal. In some embodiments, the measurement system is established as a radio frequency measurement system that comprises, for example, a rotary antenna and an analysis unit being connected to the rotary antenna in a signal transmitting manner. The rotary antenna is a directional antenna. The rotary antenna is configured to receive the emitter signal and to forward the received emitter signal to the analysis unit for further processing. The measurement system is configured in some embodiments to gather a momentary position of the rotary antenna. The analysis unit is configured to determine a momentary frequency spectrum of the emitter signal and to combine the momentary frequency spectrum with the momentary position to generate source direction data comprising information on both the momentary frequency spectrum of the emitter signal and the momentary position of the rotary antenna.

In some embodiments, the momentary position signal may be assigned to information on at least a current rotational angle of the rotary antenna. Moreover, the momentary position may be assigned to information on a (stationary or absolute) location of the rotary antenna, for example the geographic location, and in the form of GPS data in some embodiments.

The measurement system according to the disclosure is based on the idea that a combination of the momentary frequency spectrum (obtained from the emitter signal received by the rotary antenna) with the momentary position of the rotary antenna allows for a fast and uncomplicated identification of the source direction of the emitter signal. If the momentary frequency spectrum fulfills certain requirements, e.g. if it contains a certain frequency, possibly with a certain intensity, it can be deduced that this emitter signal has to come from a signal source other than pure background radiation. The momentary position gathered at the same time as the concerned emitter signal is received then contributes the rotational angle corresponding to the receiving direction of this particular emitter signal, such that the source direction can easily be identified.

In other words, it can be verified at which frequency of the spectrum received an emitter signal is received and from what direction the emitter signal is coming (due to the additional information regarding the momentary position of the rotary antenna).

In other words, directional information of the emitter signal is obtained additionally to the frequency spectrum.

The directional resolution of the measurement system is substantially determined by the directional characteristics of the rotary antenna. Accordingly, a rotary antenna having a particularly narrow receiving lobe may be chosen if a high resolution is required. Generally, the smaller the antenna beam of the rotary antenna, the better its azimuth resolution.

Thus, the measurement system according to the disclosure provides a particularly uncomplicated and cost-efficient way of determining the source direction of at least one emitter being the signal source of the emitter signal, for example of at least one pulsed emitter, as no additional equipment for pulse detection or the like is needed and the source direction may even be determined without further post-processing of the source direction data. Moreover, a transmission frequency of the at least one emitter is identified by determining the momentary frequency spectrum of the emitter signal.

In other words, the source direction data comprises information on both the position of the at least one emitter and the transmission frequency of the at least one emitter. Based on the source direction data, different emitters being positioned at different locations and/or having different transmission frequencies can be distinguished from each other. In some embodiments, different emitter may be positioned at the same location, but emitting signals with different transmission frequencies.

In some embodiments, the analysis unit may be part of a measurement instrument that is established as at least one of a spectrum analyzer, an oscilloscope and/or a portable measurement device. For example, the analysis unit may be established as pure hardware, as pure software or as a combination of both.

The rotary antenna may be stationary at its local position or moving while rotating or rather spinning.

The measurement system is configured to gather a momentary position of the rotary antenna so that the respective information can be used by the analysis unit. This information may be, for example, gathered by a sensor and/or by analyzing the drive of the rotary antenna for obtaining information with regard to the angle of rotation.

For instance, the rotary antenna is configured to generate a position signal comprising information on the momentary position of the rotary antenna and to forward the position signal to the analysis unit as well.

Accordingly, the analysis unit may be configured to determine the momentary frequency spectrum of the emitter signal and to combine the momentary frequency spectrum with the position signal to generate the source direction data.

In general, sporadic and continuous emitter can be distinguished from each other by the measurement system and the data gathered.

In general, the information regarding the frequency spectrum obtained and the momentary position of the rotary antenna are combined to provide additional information.

This additional information may be used for distinguishing sporadic emitters and continuous emitters from each other.

According to a certain aspect of the disclosure, the analysis unit is configured to perform a fast Fourier transform of the emitter signal. Thus, the momentary frequency spectrum can be determined in a fast way and/or substantially in real time. For instance, the analysis unit may be enabled to calculate more than 1,000, for example more than 1,500, times per second, e.g. up to 500 MHz spectrum.

Generally, the number of momentary frequency spectrums determined by the analysis unit per revolution of the rotary antenna determines the resolution of the measurement system. For example, if the rotary antenna rotates with 200 rpm and the analysis unit calculates 1200 momentary frequency spectra per second, 360 momentary frequency spectra are calculated per revolution of the rotary antenna. In other words, for every degree the rotary antenna rotates one momentary frequency spectrum is calculated by the analysis unit in this example.

According to another aspect of the disclosure, at least one of the rotary antenna or the analysis unit is configured to apply a time stamp to at least one of the emitter signal and the momentary position. The at least one time stamp greatly simplifies determining temporal relations and thus an affiliation between the emitter signal and the momentary position that is needed for correctly assigning the momentary frequency spectra to the respective momentary position of the rotary antenna.

In some embodiments, the fast Fourier transform may be performed on a radio frequency signal measured that contains the emitter signal (and optionally further signals).

In some embodiments, the processed radio frequency signal may be time stamped so that the emitter signal is time stamped.

In some embodiments, the measurement system may comprise a display being connected to the analysis unit in a signal transmitting manner, wherein the display is configured to plot the momentary frequency spectrum over the momentary position of the rotary antenna. For example, the momentary frequency spectrum is plotted over the momentary position of the rotary antenna or vice versa. The plot helps a user of the measurement system to efficiently identify the source direction merely by looking at the visualized data, i.e. without any further post-processing of the source direction data.

When plotting the frequency spectrum, only a certain property or certain properties of the frequency spectrum may be visualized. For example, only the amplitude spectrum of the emitter signal may be depicted.

In a certain embodiment of the disclosure, the plot is a two-dimensional plot, wherein the display is configured to depict the level of the momentary frequency spectrum by means of a color code. The result of this procedure is a kind of a "heat map", which allows the user to identify the source direction even faster, without a need for further post-processing of the source direction data, since high levels are colored differently than low levels. Accordingly, noise can be identified easily and disregarded.

In other words, the frequency may be plotted in x-direction, the momentary position of the rotary antenna may be plotted in y-direction, and the level of the emitter signal received in z-direction or rather a certain color according to a color code.

Alternatively, the momentary position of the rotary antenna may be plotted in x-direction, the frequency may be plotted in y-direction, and the level of the emitter signal received in z-direction or rather a certain color according to a color code.

Thus, the plot may be a three-dimensional plot or a two-dimensional plot that is augmented with a color code to represent the third dimension.

A three-dimensional plot may be provided.

Generally, shifting and/or zooming may take place in both directions, namely x-direction and y-direction, for example independently from each other, so that areas of interest may be centred.

For instance, the momentary position of the rotary antenna may be plotted with reference to a pole, for instance the magnetic north pole or rather the geographical north pole. Moreover, the momentary position of the rotary antenna may be plotted with reference to the measurement system or a platform of the system, also known as heading.

The user may mark one or more areas on the heat map, wherein the source direction data corresponding to the marked area may be post-processed by the analysis unit in order to identify the source of the emitter signal.

In some embodiments, the analysis unit may be configured to determine the source direction from the source direction data. In other words, the analysis unit may be configured to post-process the source direction data and to determine the source direction directly from the source direction data and/or from an analysis of above-mentioned plot.

For example, the measurement system further comprises a memory with a database, wherein the analysis unit is configured to at least one of match the source direction data against the database that already comprises known source directions and add a new source direction to the database. Said differently, the database may comprise a register of known emitter signal sources such that the analysis unit may identify the relevant emitter signal source and/or its position relative to the rotary antenna in a particularly uncomplicated manner by comparing the source direction data to the database.

In some embodiments, the database may comprise characteristic frequency spectra of the known emitter signal sources that may be compared to the determined momentary frequency spectrum in order to identify the respective signal source.

Alternatively or additionally, the database may comprise position data that carries information on the position of known emitter signal sources, for example information on the geographic location of the known emitter signal sources, for example GPS data. If corresponding information on the position of the rotary antenna is available to the analysis unit, for example GPS data, the analysis unit may calculate the known source directions from the position data and the position of the rotary antenna.

If, however, none of the known emitter signal sources stored in the database matches the signal source data or rather the database does not comprise any known emitter signal source so far, a new signal source may be added to the database or the corresponding signal source data may be discarded. For example, the new signal source may be added to the database together with a momentary location and/or orientation of the rotary antenna.

In other words, the emitter signal received may be at least one of evaluated and processed by at least one algorithm in an automatic manner or manually so as to generate a list of received emitters and their respective direction and frequency. The list may be stored in the memory. For example, the already provided list in the database may be expanded by the list appropriately. Accordingly, the respective information may be stored that was gathered from the emitter signal.

In a certain embodiment of the disclosure, the analysis unit is configured to filter at least one of the emitter signal or the source direction databased on at least one pre-set filter condition. For example, the filter criteria are chosen such that only known or unknown signal sources are taken into account. Alternatively or additionally, the criteria may be such that only signal sources having predefined properties regarding transmission frequency, signal intensity and/or signal duration are taken into account. The respective data assigned to the filter criteria applied may be plotted differently, for instance not displayed or displayed by a different color. Unwanted emitters such as stationary television emitters may be blocked. Thus, those emitters may not be displayed.

Moreover, threats may be colored differently, for example depending on the filter applied.

In another embodiment according to the disclosure, the analysis unit is configured to identify transient emitter signals. Thereby and in the following, the term "transient emitter signal" is understood to describe an emitter signal that is not received with every revolution of the rotary antenna, contrary to a "permanent emitter signal" that is received with every revolution of the rotary antenna. Thus, the analysis unit can generally discriminate between permanent and transient emitter signals and these two types of signals may be visualized on the display in different ways such that the user may easily identify them.

For instance, transient signals may be at least one of highlighted in a certain color and displayed with a certain resolution, for example a magnified one. Thus, post processing is not necessary as the respective information is already visible.

The analysis unit may be configured to average the source direction data over at least two revolutions of the rotary antenna. Using that average, transient signals can be identified in an uncomplicated and fast manner. In each revolution of the rotary antenna, the calculated average of the source direction data is subtracted from the source direction data determined in that particular revolution. If the result of the subtraction is substantially zero, the corresponding emitter signal is identified to be a permanent one. If, however, the result of the subtraction is substantially different from zero, the corresponding emitter signal is identified to be a transient one.

For example, at least one test device is provided, the at least one test device being configured to generate and emit the emitter signal. The test device may have known emission characteristics and may be used to calibrate and/or test the measurement system. For example, the emission characteristics of the test device may be adapted to test and/or calibrate the measurement system at several different central frequencies and/or bandwidths.

Embodiments of the present disclosure further provide a method for identifying a source direction of a wireless electromagnetic emitter signal, comprising the following steps:

providing a measurement system with a rotary antenna and an analysis unit being connected to the analysis unit in a signal transmitting manner;

receiving the emitter signal via the rotary antenna and forwarding the emitter signal to the analysis unit;

gathering a momentary position of the rotary antenna and forwarding the momentary position to the analysis unit; and determining a momentary frequency spectrum of the emitter signal and combining the momentary frequency spectrum with the momentary position to generate source direction data comprising information on both the momentary frequency spectrum of the emitter signal and the momentary position of the rotary antenna.

The method according to the disclosure is based on the idea that a combination of the momentary frequency spectrum with the momentary position allows for a fast and uncomplicated identification of the source direction. If the momentary frequency spectrum fulfills certain requirements, e.g. if it contains a certain frequency, possibly with a certain intensity, it can be deduced that this emitter signal has to come from a signal source other than pure background radiation (noise). The momentary position gathered at the same time as the concerned emitter signal is received then contributes the rotational angle corresponding to the receiving direction of this particular emitter signal, such that the source direction can easily be identified.

As is described above with regards to the measurement system, the source direction data comprises information on both the position of at least one emitter and the transmission frequency of the at least one emitter. Based on the source direction data, different emitters being positioned at different locations and/or having different transmission frequencies can be distinguished from each other.

Regarding the remaining advantages, reference is made to the explanations given above regarding the measurement system.

In a certain embodiment of the disclosure, a Fast Fourier transform (FFT) of the emitter signal is performed in order to obtain the momentary frequency spectrum. Thus, the momentary frequency spectrum can be determined in a fast way and/or substantially in real time.

According to another aspect of the disclosure, the momentary frequency spectrum is plotted over the momentary position of the rotary antenna on a display of the measurement system. For example, the momentary frequency spectrum is plotted over the momentary position of the rotary antenna or vice versa. The plot helps a user of the measurement system to efficiently identify the source direction merely by looking at the visualized data, i.e. without any further post-processing of the source direction data.

The plot may be a two-dimensional plot (x- and y-directions), wherein the level of the momentary frequency spectrum is depicted by means of a color code. Therefore, the color code may correspond to a z-direction. The result of this procedure is a kind of a "heat map", which allows the user to identify the source direction of a signal emitter even faster, without a need for further post-processing of the source direction data. The user may mark one or more areas on the heat map for further post-processing in order to identify the source of the emitter signal. Thus, the user may zoom or rather shift at least parts of the displayed content.

Alternatively to the two-dimensional plot, the plot may be a three-dimensional plot.

For example, the source direction is determined from the source direction data. In other words, the source direction data may be post-processed in order to determine the source direction.

According to a further aspect of the disclosure, the determined source direction is compared to a database of known source directions and/or added to the database. The database comprises a register of known emitter signal sources such that the relevant emitter signal source and/or its position relative to the rotary antenna can be identified in a particularly uncomplicated manner by comparing the source direction data to the database.

In some embodiments, the database may comprise characteristic frequency spectra of the known emitter signal sources that may be compared to the determined momentary frequency spectrum in order to identify the respective signal source.

Alternatively or additionally, the database may comprise position data that carries information on the position of known emitter signal sources, for example information on the geographic location of the known emitter signal sources, for example GPS data. If corresponding information on the position of the rotary antenna is available to the analysis unit, for example GPS data, the analysis unit may calculate the known source directions from the position data and the position of the rotary antenna.

If, however, none of the known emitter signal sources stored in the database matches the signal source data or no emitter signal sources are known so far, a new signal source may be added to the database or the corresponding signal source data may be discarded. For example, the new signal source may be added to the database together with a momentary location and/or orientation of the rotary antenna.

In a certain embodiment of the disclosure, at least one of the emitter signal and the source direction data is filtered based on at least one pre-defined filter criterion. For example, the at least one filter criterion is chosen such that only known or unknown signal sources are taken into account. Alternatively or additionally, the criterion may be such that only signal sources having predefined properties regarding transmission frequency, signal intensity and/or signal duration are taken into account.

Transient emitter signals may be identified and plotted on a display in a manner being different from how permanent emitter signals are plotted on the display. For example, transient signals may be displayed in a different color, for example in a signal color, and/or with a different resolution, for example a higher resolution. This way, the user can easily identify the transient signals and/or discriminate between transient and permanent emitter signals.

In order to enhance the visibility of transient signals on the display, the transient signals are displayed longer than they are actually received. For example, a maximum value of the transient signal with an attenuation function applied to it may be displayed, such that the transient signal remains visible over several revolutions of the rotary antenna.

Generally, a maximum hold function, also called max hold function, may be applied so that the respective information is displayed for a longer time than it actually appears. The user may set the duration for the maximum hold function appropriately so that it is ensured that the user has sufficient time to obtain the information.

According to an aspect of the disclosure, the source direction data is averaged over at least two revolutions of the rotary antenna in order to identify the transient emitter signals. Using that average, transient signals can be identified in an uncomplicated and fast manner. In each revolution of the rotary antenna, the calculated average of the source direction data is subtracted from the source direction data determined in that particular revolution. If the result of the subtraction is substantially zero, the corresponding emitter signal is identified to be a permanent one. If, however, the result of the subtraction is substantially different from zero, the corresponding emitter signal is identified to be a transient one.

Generally, the amount of source direction data being averaged, namely the number of revolutions of the rotary antenna that are taken into account for the averaging, can be set by a user.

The settings done by the user may be done via an input unit of the measurement system.

DESCRIPTION OF THE DRAWINGS

The foregoing aspects and many of the attendant advantages of the claimed subject matter will become more readily appreciated as the same become better understood by reference to the following detailed description, when taken in conjunction with the accompanying drawings, wherein:

DETAILED DESCRIPTION

The detailed description set forth below in connection with the appended drawings, where like numerals reference like elements, is intended as a description of various embodiments of the disclosed subject matter and is not intended to represent the only embodiments. Each embodiment described in this disclosure is provided merely as an example or illustration and should not be construed as preferred or advantageous over other embodiments. The illustrative examples provided herein are not intended to be exhaustive or to limit the claimed subject matter to the precise forms disclosed.

Figure 1:
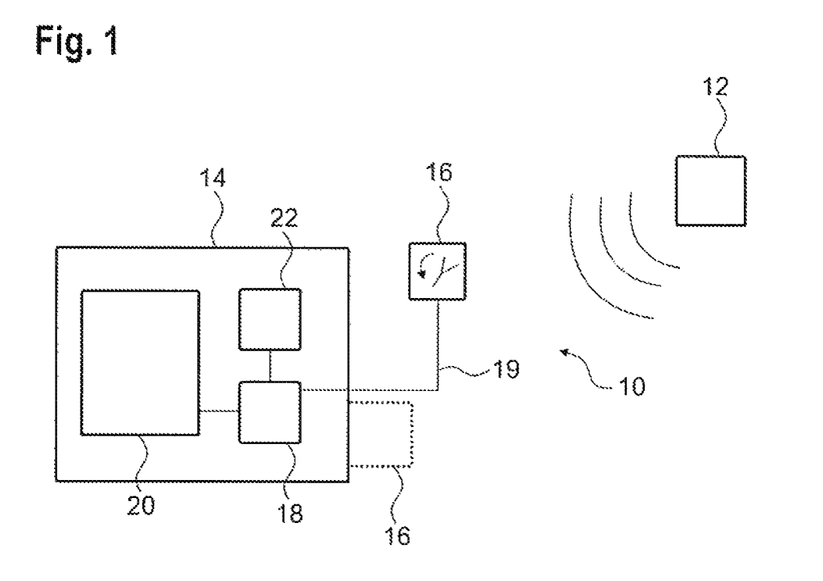
FIG. 1 schematically shows a representative embodiment of a measurement system according to the disclosure.

FIG. 1 schematically shows a measurement system 10 and an emitter 12 being configured to emit a wireless electromagnetic emitter signal. For example, the emitter 12 is configured to emit radar signals. In other words, the emitter 12 relates to a (radar) signal emitter. The wireless electromagnetic emitter signal may be a high frequency (HF) or rather radio frequency (RF) signal.

The measurement system 10 also comprises a measurement instrument 14 and a rotary antenna 16. The measurement instrument 14 comprises an analyzer or analysis unit 18 being connected to the rotary antenna 16 in a signal transmitting manner, for example via a cable 19.

In the embodiment shown in FIG. 1, the rotary antenna 16 is established separately from the measurement instrument 14. Alternatively, the rotary antenna 16 also may be attached directly to the measurement instrument 14, as is indicated by the dashed lines in FIG. 1.

The measurement instrument 14 may be established as at least one of a spectrum analyzer, an oscilloscope and/or a portable measurement device being adapted to perform the methods described below.

The measurement instrument 14 further comprises a display 20 and a memory 22 with a database stored thereon, wherein the display 20 and the memory 22 are both connected to the analysis unit 18 in a signal transmitting manner.

Figure 4:
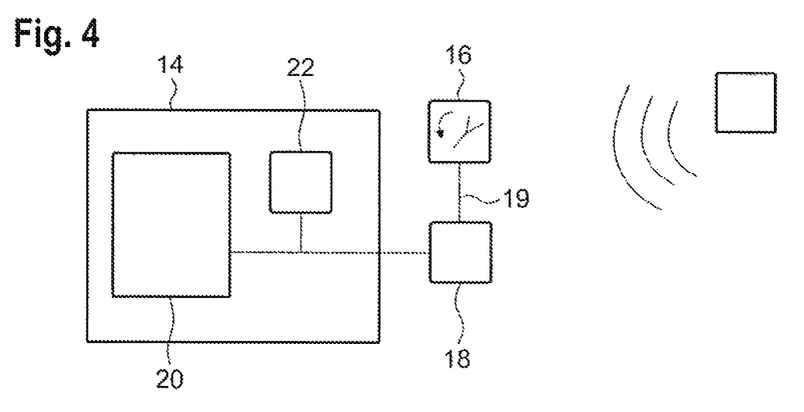
FIG. 4 schematically shows a measurement system according to a further embodiment of the disclosure.

An alternative embodiment of the measurement system 10 is shown in FIG. 4. There, the analysis unit 18 is established separately from the measurement instrument 14 and the analysis unit 18 is connected to the measurement instrument 14 in a signal transmitting manner.

In this case, the measurement instrument 14 may be established as a personal computer, a laptop, an oscilloscope or as any kind of smart device. Moreover, the measurement instrument 14 may be configured to control the analysis unit 18 and/or to process data received by the analysis unit 18.

In all embodiments, the measurement system 10 is established as a radio frequency measurement system being adapted to identify a source direction of the wireless electromagnetic emitter signal, namely the one emitted by the emitter 12. In other words, the measurement system 10 is adapted to determine a relative position between the rotary antenna 16 and the at least one emitter 12.

Figure 2:
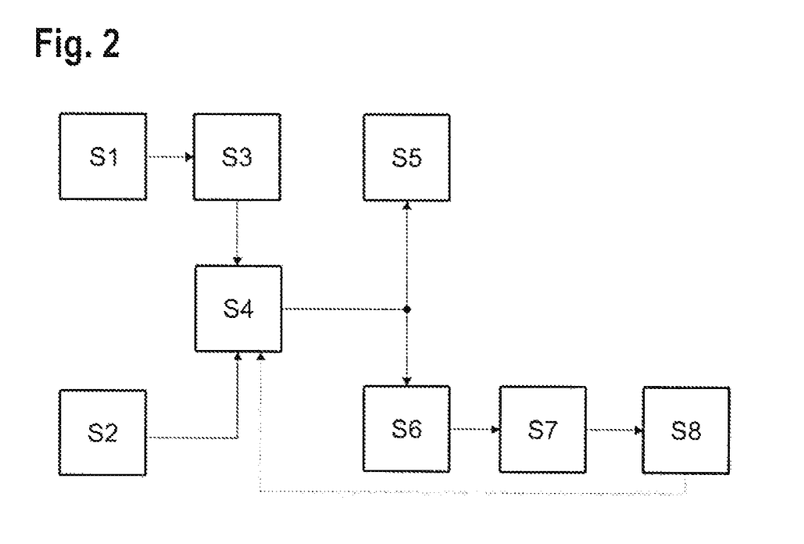
FIG. 2 schematically shows a flow chart of a representative method for identifying a source direction according to the disclosure.
Figure 3A:
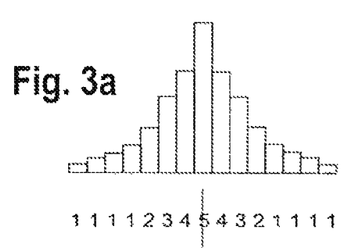
FIGS. 3(a)-3(d) show several exemplary frequency spectra of emitter signals.
Figure 3B:
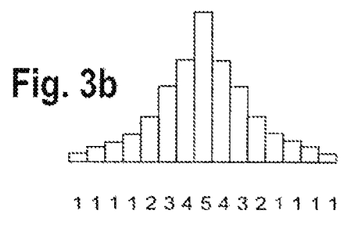
Figure 3C:
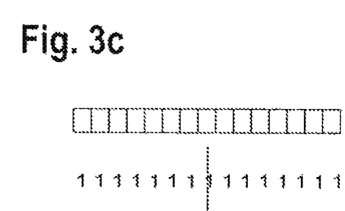
Figure 3D:
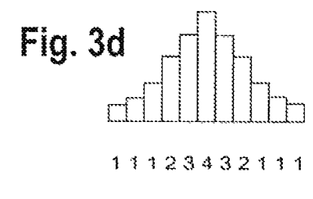

In some embodiments, the measurement system 10 is configured to perform a method for identifying the source direction of the wireless electromagnetic emitter signal generated by the emitter 12, which will now be described in more detail. First, the emitter signal is received via the rotary antenna 16 and forwarded to the analysis unit 18 (step S1). More precisely, the rotary antenna 16 is spinning and receives the emitter signal or rather several emitter signals while spinning.

At the same time, the measurement system 10 gathers a momentary position of the rotary antenna 16. The momentary position is forwarded to the analysis unit 18 for further processing (step S2). For instance, the rotary antenna 16 itself generates a position signal comprising information on its momentary position wherein the position signal is forwarded to the analysis unit 18. Alternatively, the momentary position is measured or rather sensed in a different way, for instance by an external sensor.

The momentary position, for example the position signal, comprises information on at least a current rotational angle of the rotary antenna 16. Moreover, the momentary position, for example the position signal, may comprise information on a location of the rotary antenna 16, for example the geographic location, and in the form of GPS data in some embodiments. Generally, the rotary antenna 16 may be stationary or moving while spinning or rather rotating so that the location of the rotary antenna 16 may change.

In some embodiments, a time stamp is added to both the emitter signal and the momentary position, for example the position signal, in steps S1 and S2, respectively, such that determining temporal relations and thus an affiliation between the emitter signal and the momentary position is greatly simplified.

The analysis unit 18 then determines a momentary frequency spectrum of the emitter signal (step S3) by performing a Fast Fourier transform (FFT) of the emitter signal or by other suitable mathematical methods. More precisely, the frequency spectrum is determined around a central frequency within a certain bandwidth, wherein at least one of the central frequency and the bandwidth may be adjustable by a user. In other words, the frequency spectrum is determined within a certain frequency window being defined by a minimal frequency and by a maximum frequency.

Usually, the emitter 12 has a certain central emitter frequency. The analysis unit 18 may determine the central emitter frequency from the determined momentary frequency spectrum via a spectrum analysis of the momentary frequency spectrum. For example, the central frequency and/or the central emitter frequency may lie in the range of 1 kHz up to 1 THz, for example between 1 MHz and 500 GHz, for example between 50 MHz and 50 GHz, whereas the bandwidth may be up to 500 MHz or even larger.

Note that if the emitter signal contains a time stamp, also the corresponding momentary frequency spectrum contains a time stamp such that a temporal correlation between the momentary position, for example the position signal, and the momentary frequency spectrum is particularly easy to identify. The emitter signal can contain a time stamp in case that a time stamp was added.

Now, the momentary frequency spectrum and the momentary position are combined by the analysis unit 18 in order to generate source direction data comprising information on both the momentary frequency spectrum of the emitter signal and the momentary position of the rotary antenna 16 (step S4).

The source direction data is then visualized on the display 20 (step S5). For example, the momentary frequency spectrum is plotted over the momentary position of the rotary antenna 16 or vice versa. In other words, the momentary frequency spectrum is plotted in x- or y-direction whereas the momentary position of the rotary antenna 16 is plotted in the other of both directions, namely in y- or x-direction.

When plotting the frequency spectrum, only a certain property or certain properties of the frequency spectrum may be visualized. For example, only the amplitude spectrum of the emitter signal may be depicted.

For example, the level of the momentary frequency spectrum is depicted by a color code. For this purpose, the level of the momentary frequency spectrum may be mapped onto a set of colors, wherein different colors correspond to different magnitudes of the level of the momentary frequency spectrum. The color code substantially corresponds to a z-direction.

The result of the procedure described above is a kind of a "heat map", which allows the user to directly identify the direction or directions that a wireless electromagnetic signal or wireless electromagnetic signals is or are coming from, respectively, without post-processing of the source direction data. The user may mark one or more areas on the heat map, wherein the source direction data corresponding to the marked area may be post-processed by the analysis unit 18 in order to identify the source of the emitter signal, as will be described below.

Alternatively or additionally to the steps performed in step S5, the source direction may be directly determined from the source direction data by the analysis unit 18 (step S6) by post-processing of the source direction data.

As a next step, the source or sources of the emitter signal is/are identified (step S7). One possibility to achieve this is that the database comprises a register of known emitter signal sources such that the analysis unit 18 may identify the emitter 12 and/or its position relative to the rotary antenna 16 by comparing the source direction data to the database. For example, the database comprises characteristic frequency spectra of the known emitter signal sources that may be compared to the determined momentary frequency spectrum in order to identify the respective signal source.

If, however, none of the known emitter signal sources stored in the database matches the signal source data or no emitter signal source is known so far, a new signal source may be added to the database or the corresponding signal source data may be discarded.

In some embodiments, the analysis unit 18 may filter the source direction databased on pre-defined filter criteria such that only signal source data corresponding to certain signal sources remains while the remaining signal source data is discarded. For example, the filter criteria are chosen such that only known or unknown signal sources are taken into account. Alternatively or additionally, the criteria may be such that only signal sources having predefined properties regarding transmission frequency, signal intensity and/or signal duration are taken into account.

Emitter signals fulfilling the pre-defined filter criteria may be visualized on the display 20 in a different manner than emitter signals not fulfilling the pre-defined filter criteria. For example, the two types of emitter signals may be displayed in different colors or one of the two types may not be displayed at all.

Moreover, the analysis unit 18 determines whether the respective emitter signal is a permanent one or a transient one (step S8), i.e. whether the emitter signal can be measured in substantially every revolution of the rotary antenna 16 or not. For this purpose, the analysis unit 18 in some embodiments determines the source direction data in every revolution of the rotary antenna 16 and calculates an average of the source direction data over at least two revolutions of the rotary antenna 16, for example over several revolutions of the rotary antenna 16.

In each revolution of the rotary antenna 16, the calculated average of the source direction data is subtracted from the source direction data determined in that particular revolution. If the result of the subtraction is substantially zero, the corresponding emitter signal is identified to be a permanent one. If, however, the result of the subtraction is substantially different from zero, the corresponding emitter signal is identified to be a transient one.

FIGS. 3(*a*)-3(*d*) show an example of the procedure of step S8. FIGS. 3(*a*) and 3(*b*) show an exemplary frequency spectrum corresponding to an emitter signal received during a first and a second revolution of the rotary antenna 16, respectively. As can clearly be seen, this emitter signal is a permanent one, as it is substantially the same in the two revolutions of the rotary antenna 16. Thus, subtracting the average frequency spectrum from the momentary frequency spectrum substantially results in a zero function and this emitter signal is classified as permanent.

Likewise, FIGS. 3(*c*) and 3(*d*) show a second example of a frequency spectrum corresponding to an emitter signal received during a first and a second revolution of the rotary antenna 16, respectively. As can clearly be seen, this emitter signal is a transient one, as it substantially differs between the two revolutions of the rotary antenna 16. Thus, subtracting the average frequency spectrum from the momentary frequency spectrum results in a function being substantially different from a zero function and this emitter signal is classified as transient.

As indicated by the dashed lines in FIG. 2, transient and permanent emitter signals may be visualized on the display 20 in ways different from each other. For example, transient signals may be displayed in a different color, for example in a signal color, and/or with a different resolution, for example a higher resolution.

In order to enhance the visibility of transient signals on the display, the transient signals are displayed longer than they are actually received. For example, a maximum value of the transient signal with a attenuation function applied to it may be displayed, such that the transient signal remains visible over several revolutions of the rotary antenna 16.

Generally, a plot is provided in which the level of the received emitter signal(s) is plotted (in z-direction or rather according to a color code) over the frequency of the received emitter signal(s) and the direction of the rotary antenna 16, namely the current rotational angle of the rotary antenna 16 as well as (stationary or absolute) location of the rotary antenna 16.

Of course, the example methods explained above are not limited to one emitter 12. There may be several emitters 12 that are placed at different locations and/or have different transmission frequencies. With the methods explained above, the several emitters 12 may be distinguished from each other even if the corresponding emitter signals reach the rotary antenna 16 from the same direction as long as they are emitted with different transmission frequencies.

For the purpose of calibrating and/or testing the measurement system 10, the emitter 12 may be provided as a test device having known emission characteristics. For example, the emission characteristics of the test device may be adapted to test and/or calibrate the measurement system 10 at several different central frequencies and/or bandwidths.

It should be understood that each block of the block diagrams and/or flowchart illustrations, and any combination of blocks in the block diagrams and flowchart illustrations described herein and/or illustrated in the FIGURES, could be implemented by special purpose hardware-based computer systems that perform the specified functions or operations, or combinations of special purpose hardware and computer instructions. In some embodiments, the measurement instrument 14 and/or analysis unit 18 (e.g., analyser, etc.) is configured as a special purpose computing device that implements the functionality or methodologies of the blocks, flowcharts, etc., disclosed herein.

It should be also understood that each block of any of the block diagrams and/or flowchart illustrations, respectively, and described herein and/or illustrated in the FIGURES may be implemented in part by computer program instructions, e.g., as logical steps or operations executing on a processor in a computing system. These computer program instructions may be loaded onto a computer, such as a special purpose computer or other programmable data processing apparatus to produce a specifically-configured machine, such that the instructions which execute on the computer or other programmable data processing apparatus implement the functions specified in the flowchart block or blocks, descriptions herein, etc. The term computer can include any processing structure, including but not limited to a processor (e.g., a microprocessor), a central processing unit (CPU), a digital signal processor (DSP), an application-specific integrated circuit (ASIC), a field-programmable gate array (FPGA), a system on a chip (SoC), or the like, or any combinations thereof.

In an embodiment, the measurement instrument 14 and/or analysis unit 18, etc., includes a microprocessor and a memory storing logic modules and/or instructions for carrying out the function(s) of these components, either separately or in any combination. In an embodiment, the measurement instrument 14 and/or analysis unit 18, etc., includes one or more ASICs having a plurality of predefined logic components. In an embodiment, the measurement instrument 14 and/or analysis unit 18, etc., includes one or more FPGA having a plurality of programmable logic components. In an embodiment, the measurement instrument 14 and/or analysis unit 18, etc., includes hardware circuit implementations (e.g., implementations in analog circuitry, implementations in digital circuitry, and the like, and combinations thereof). In an embodiment, the measurement instrument 14 and/or analysis unit 18, etc., includes combinations of circuits and computer program products having software or firmware instructions stored on one or more computer readable memories that work together to cause a device to perform one or more methodologies or technologies described herein.

The present application may also reference quantities and numbers. Unless specifically stated, such quantities and numbers are not to be considered restrictive, but exemplary of the possible quantities or numbers associated with the present application. Also in this regard, the present application may use the term "plurality" to reference a quantity or number. In this regard, the term "plurality" is meant to be any number that is more than one, for example, two, three, four, five, etc. The terms "about," "approximately," "near," etc., mean plus or minus 5% of the stated value. For the purposes of the present disclosure, the phrase "at least one of A, B, and C," for example, means (A), (B), (C), (A and B), (A and C), (B and C), or (A, B, and C), including all further possible permutations when greater than three elements are listed.

The principles, representative embodiments, and modes of operation of the present disclosure have been described in the foregoing description. However, aspects of the present disclosure which are intended to be protected are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure, as claimed.

The embodiments of the invention in which an exclusive property or privilege is claimed are defined as follows:

1. A measurement system for identifying a source direction of a wireless electromagnetic emitter signal, the measurement system being a radio frequency measurement system that comprises:
   a rotary antenna and an analyzer being connected to the rotary antenna in a signal transmitting manner, wherein
   the rotary antenna being a directional antenna, the rotary antenna being configured to rotate with a predetermined number of revolutions per minute, the rotary antenna being configured to receive the emitter signal and to forward the received emitter signal to the analyzer for further processing;
   the measurement system being configured to gather a momentary position of the rotary antenna;
   wherein at least one of the rotary antenna or the analyzer is configured to apply time stamps to the emitter signal and the momentary position;
   the analyzer being configured to determine a momentary frequency spectrum of said emitter signal and to combine said momentary frequency spectrum with said momentary position to generate source direction data comprising information on both the momentary frequency spectrum of the emitter signal and the momentary position of the rotary antenna, wherein the analyzer is configured to assign the momentary frequency spectrum to the respective momentary position of the rotary antenna based on the time stamps; and
   wherein the analyzer is configured to determine the source direction from the source direction data.

2. The measurement system of claim 1, wherein the analyzer is configured to perform a fast Fourier transform of the emitter signal.

3. The measurement system of claim 1, wherein the measurement system comprises a display being connected to the analyzer in a signal transmitting manner, wherein the display is configured to plot the momentary frequency spectrum over the momentary position of the rotary antenna.

4. The measurement system of claim 3, wherein the plot is a two-dimensional plot, and wherein the display is configured to depict the level of the momentary frequency spectrum by a color code.

5. The measurement system of claim 1, further comprising a memory with a database, wherein the analyzer is configured to at least one of match the source direction data against the database that already comprises known source directions or add a new source direction to the database.

6. The measurement system of claim 1, wherein the analyzer is configured to filter at least one of the emitter signal or the source direction data based on at least one pre-set filter condition.

7. The measurement system of claim 1, wherein the analyzer is configured to identify transient emitter signals.

8. The measurement system of claim 7, wherein the analyzer is configured to average the source direction data over at least two revolutions of the rotary antenna.

9. The measurement system of claim 1, wherein at least one test device is provided, the at least one test device being configured to generate and emit the emitter signal.

10. A method for identifying a source direction of a wireless electromagnetic emitter signal, comprising the following steps:
   providing a measurement system with a rotary antenna and an analyzer being connected to the analyzer in a signal transmitting manner;
   receiving the emitter signal via the rotary antenna, wherein the rotary antenna is rotating with a predetermined number of revolutions per minute, and forwarding the emitter signal to the analyzer;
   gathering a momentary position of the rotary antenna and forwarding the momentary position to the analyzer;
   applying time stamps to the emitter signal and the momentary position;
   determining a momentary frequency spectrum of the emitter signal and combining said momentary frequency spectrum with said momentary position to generate source direction data comprising information on both the momentary frequency spectrum of the emitter signal and the momentary position of the rotary antenna, wherein the momentary frequency spectrum is assigned to the respective momentary position of the rotary antenna based on the time stamps; and
   determining the source direction from the source direction data.

11. The method of claim 10, wherein a Fast Fourier transform of the emitter signal is performed in order to obtain the momentary frequency spectrum.

12. The method of claim 10, wherein the momentary frequency spectrum is plotted over the momentary position of the rotary antenna on a display of the measurement system.

13. The method of claim 12, wherein the plot is a two-dimensional plot, and wherein the level of the momentary frequency spectrum is depicted by means of a color code.

14. The method of claim 10, wherein the determined source direction is at least one of compared to a database of known source directions and added to said database.

15. The method of claim 14, wherein at least one of the emitter signal or the source direction data is filtered based on at least one pre-defined filter criterion.

16. The method of claim 10, wherein transient emitter signals are identified and plotted on a display in a manner being different from how permanent emitter signals are plotted on the display.

17. The method of claim 16, wherein the source direction data is averaged over at least two revolutions of the rotary antenna in order to identify the transient emitter signals.

\* \* \* \* \*